Sept. 16, 1941.  V. FINSTON  2,255,922
RETURN-TYPE FAST TRANSFER MACHINE
Filed Nov. 12, 1938  5 Sheets-Sheet 1

INVENTOR
VICTOR FINSTON
by
ATTORNEYS

Sept. 16, 1941.  V. FINSTON  2,255,922
RETURN-TYPE FAST TRANSFER MACHINE
Filed Nov. 12, 1938  5 Sheets-Sheet 3

INVENTOR
VICTOR FINSTON
BY
ATTORNEYS

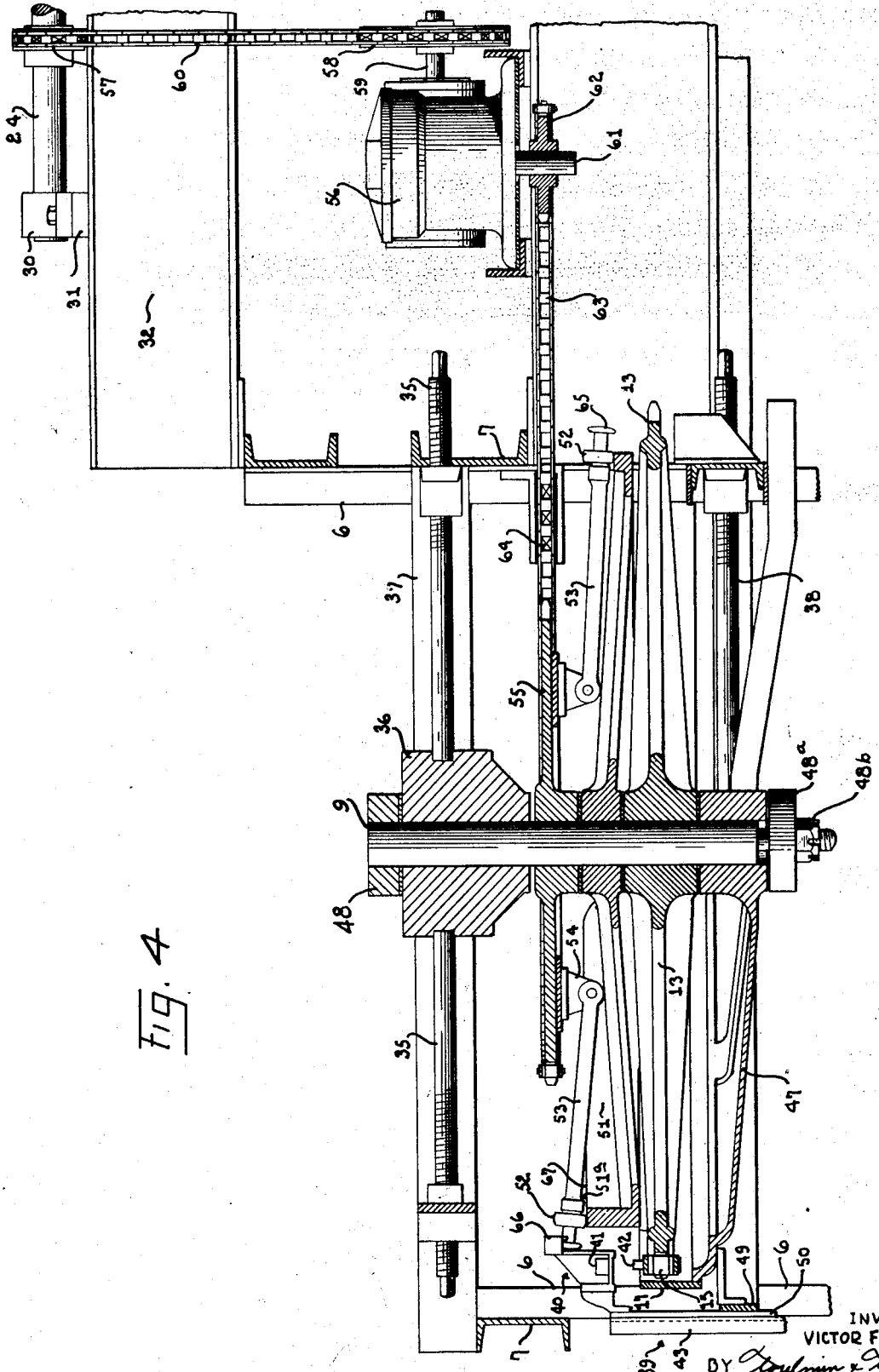

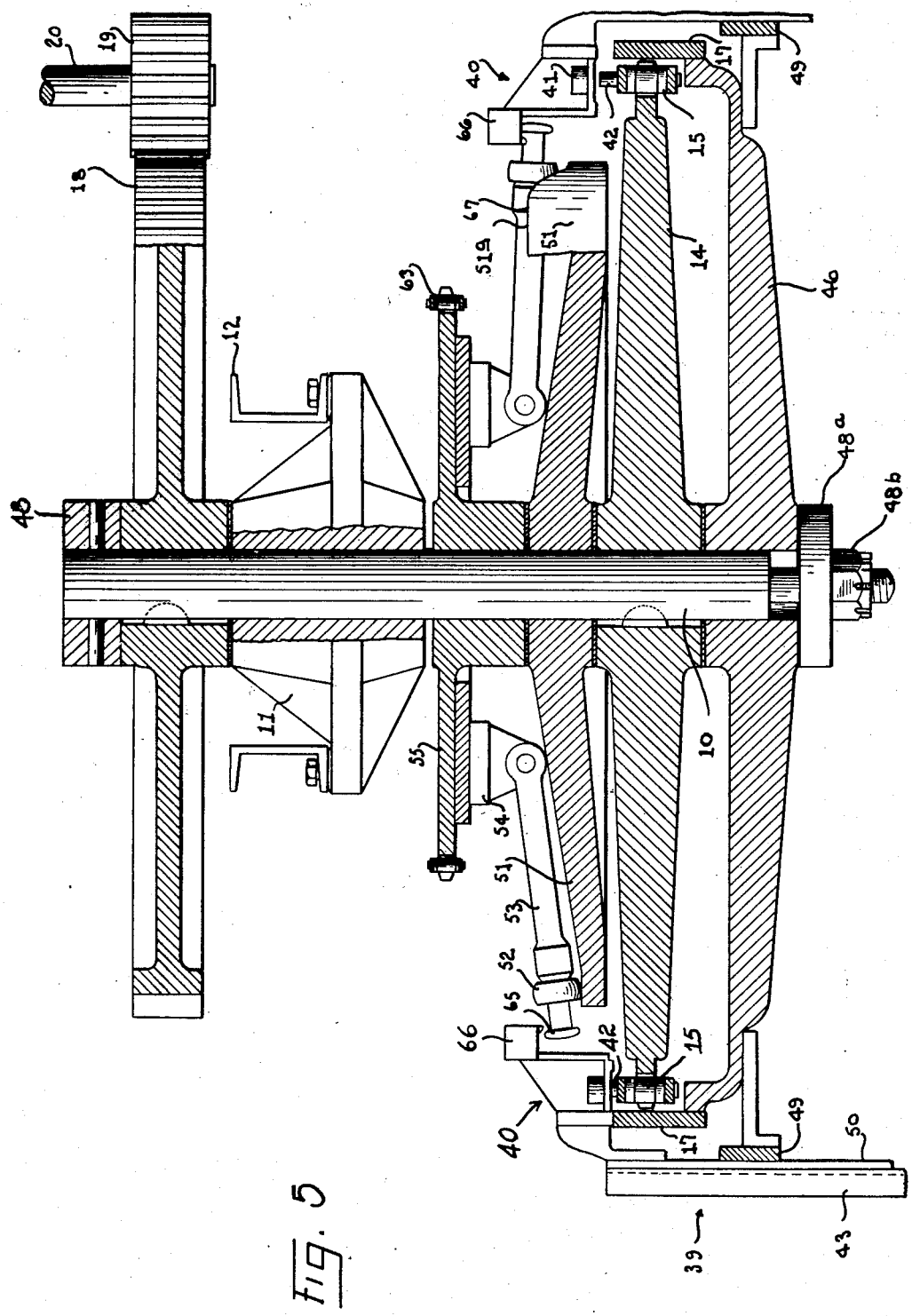

Patented Sept. 16, 1941

2,255,922

UNITED STATES PATENT OFFICE 2,255,922

RETURN-TYPE FAST TRANSFER MACHINE

Victor Finston, Chicago, Ill., assignor to The Meaker Company, Chicago, Ill., a corporation of Illinois Application November 12, 1938, Serial No. 240,183

16 Claims. (Cl. 204—202)

This invention relates to work piece conveying machines for moving materials around a circuitous path along which the work piece materials are processed.

The invention more particularly relates to a mechanism adapted to be installed at either or both ends of a return type work piece conveying machine to spread out the carriers while being moved around the ends of the machine, so that the work pieces will not interfere with each other and to provide more space for loading and unloading the work piece carriers.

An object of this invention is to provide a rapid transfer mechanism which is readily applicable for use with any return type work piece carrying machine, such as commonly employed for transporting materials in an orbital path during which various mechanical, chemical or coating processing operations are performed on the work pieces.

In chemical or electroprocessing machines of the narrow or wide return type, such as conventionally employed for electrocleaning and plating, the mechanism of this invention may be installed at either or both ends of the machine as desired.

Another object of this invention is to provide an inexpensive mechanism which can be incorporated in the work piece carrying machine referred to at any time and not only serve the purpose of rapidly transferring work pieces around the end of the machine to eliminate interference of the work pieces but also facilitate loading and unloading of the work piece carriers.

Another object of this invention is to provide a mechanism which may be used at either end of an endless conveyor type machine so as to either prevent the work from interfering going around the end or to provide more space as required for loading and unloading at one end. If interference of the work takes place going around the ends of the machine, this invention may be placed at both ends.

Another object is to provide an end transfer mechanism for electroprocessing machines of the return type in order to accelerate the speed of transferring the work pieces around the end of the tank, increasing the distance between work piece carriers so that they can be mounted closer together than otherwise thereby economizing on the length of the machine required to handle the same amount of material as well as providing more space at the ends between the work piece carriers.

Still another object is to provide an adjustable speed transfer mechanism which may be readily installed in the conventional electroprocessing machines of the type having carrier arms which move in an orbital path through a tank or succession of tanks to spread out the work as it passes around the ends of the machine.

Another object is to provide a rapid end transfer mechanism which can be readily installed on the endless conveyor moving wheel shafts without requiring substantial alterations of the conveyor and driving arrangement.

In the drawings:

Figure 4 is an enlarged detail sectional view taken on the line 4—4 of Figure 2, looking in the direction of the arrows;

Figure 5 is an enlarged detail sectional view taken substantially on the line 5—5 of Figure 2, looking in the direction of the arrows.

Figure 1:
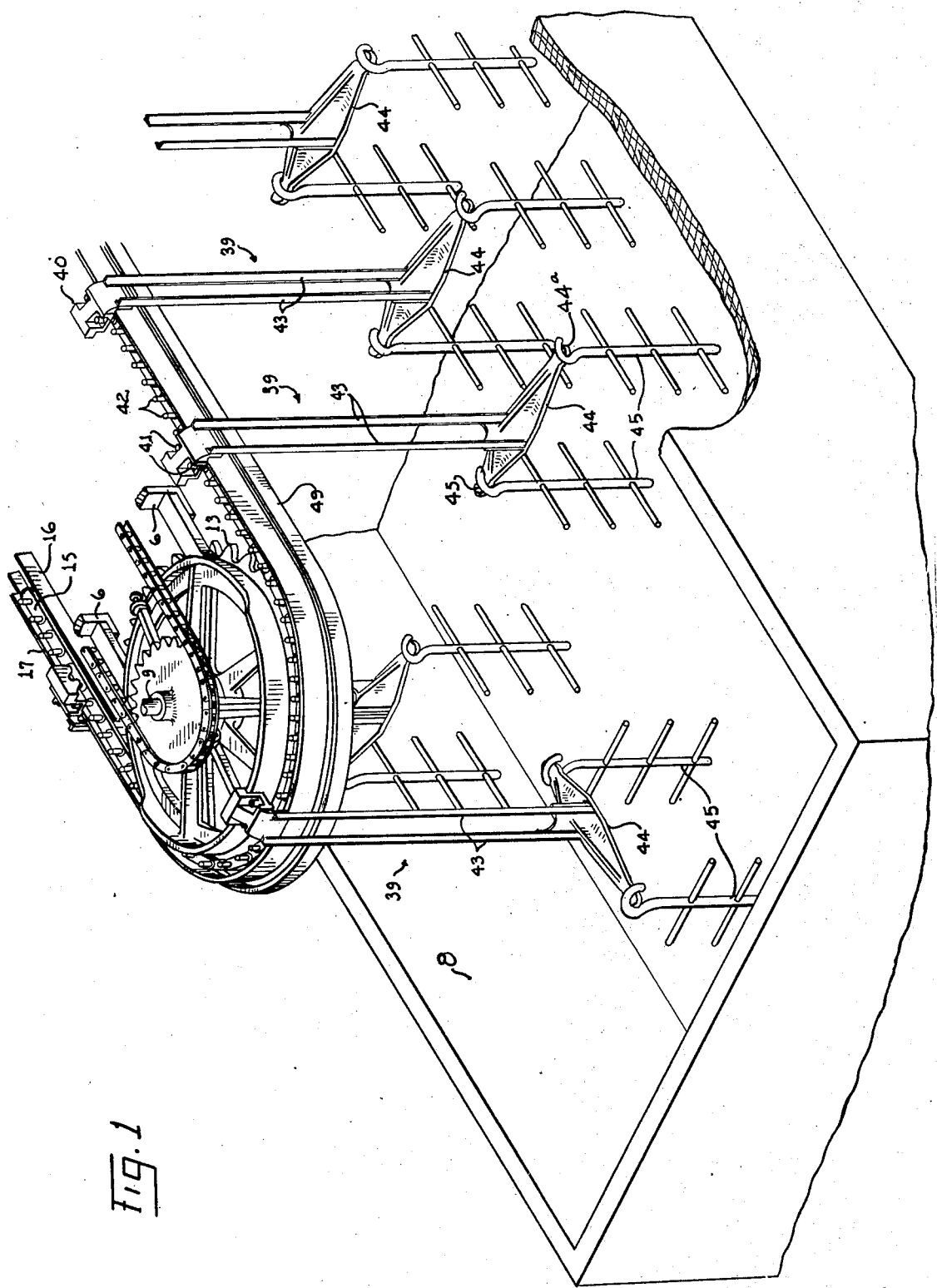
Figure 1 is a perspective view of an electroprocessing machine of the double-file carrier type embodying the rapid transfer mechanism of this invention at one end of the machine.

In the normal process of electroplating, for example, the work carriers are put on the machine as close as the operation will permit. Where two lines of work are used, or as commonly termed a double-file carrier is employed, the inside racks very often interfere as they are being moved around the end of the machine. This is brought about since the carriers are supported near the center line between the two and this brings the inside racks closer to each other and spreads the outside racks apart going around the ends of the tank or apparatus in which the work pieces are being plated.

By installing the mechanism of this invention at the ends of the plating machine, interference of the work is eliminated and the loading and unloading of the machine are facilitated. Further, by the use of the rapid end transfer mechanism on both ends of the electroplating machine, the work carriers can be placed closer together and the speed of moving the work through the plating solution reduced to achieve the same amount of plating as effected by a considerably longer plating tank, thus economizing in the space required for the electroplating machine.

Referring to the drawings in detail, the fast end transfer mechanism of this invention is illustrated as embodied in an automatic return type electroplating machine wherein both ends of the machine are provided with the mechanism of this invention. The electroplating machine illustrated comprises a frame having vertical pillars 6 which support the frame structure 7. Centrally disposed therebeneath is a tank 8 which is adapted to contain an appropriate electroplating solution. In the illustration, for convenience, a single tank is shown, but it will be understood that a series of tanks comprising the same or different treating solutions may be employed.

Rotatably mounted on the frame structure 7 are vertical shafts 9 and 10 (Figure 3) at opposite ends of the machine. The drive shaft 10 is journaled in the bearing 11, as shown in Figure 5. This bearing is bolted to the channel members 12 which in turn are attached to the frame 7 to rigidly support the mechanism. The shaft 9 is provided with a sprocket wheel 13 whereas the shaft 10 carries a sprocket wheel 14. These sprocket wheels serve to support and move a conveyor chain 15 which travels between the inner and outer guide members 16 and 17, respectively.

Figure 2:
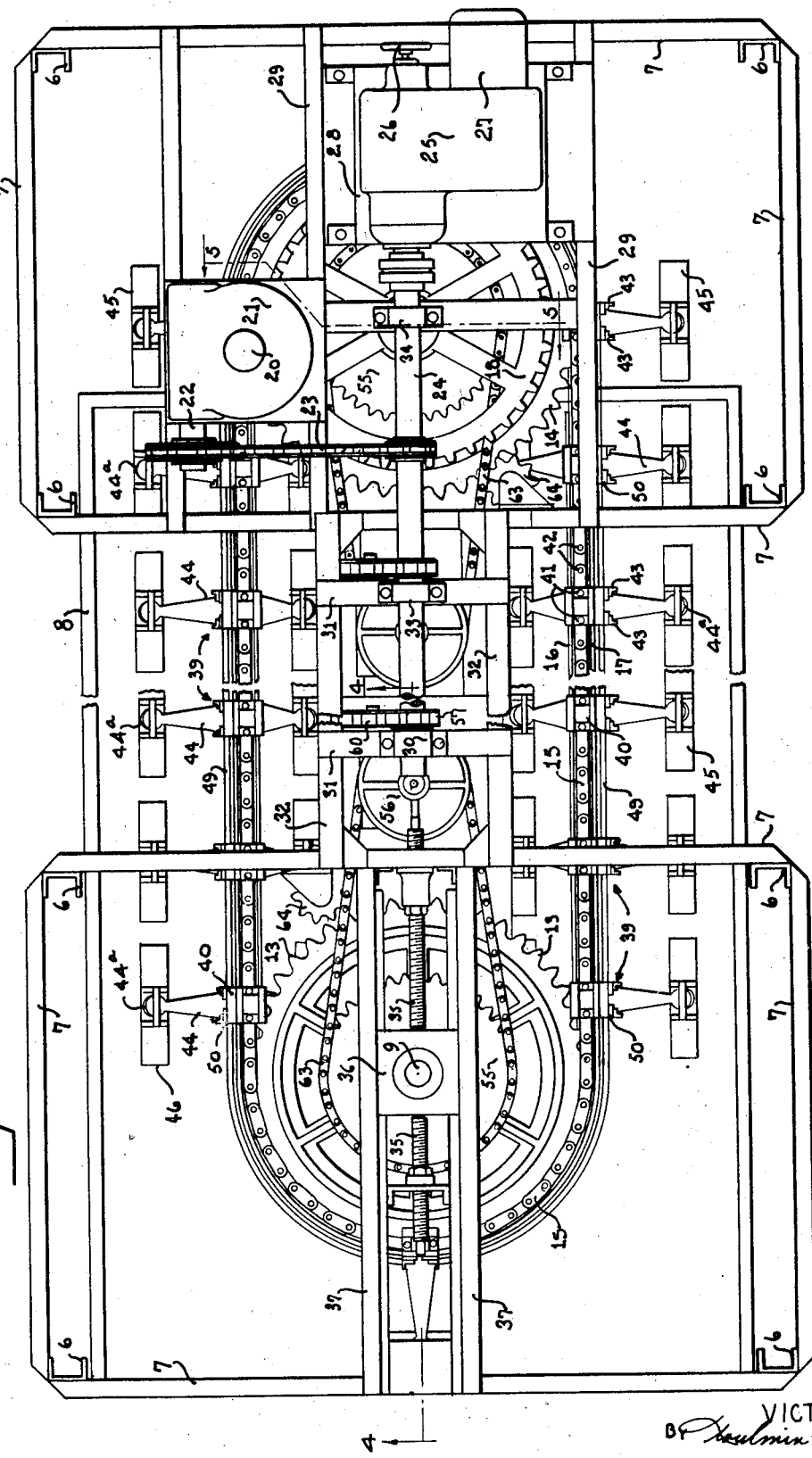
Figure 2 is a top plan view of an automatic return type of electroprocessing machine with the intermediate end portions broken away, showing the rapid transfer mechanism of this invention incorporated at both ends.

The shaft 10 is equipped with a gear wheel 18 which is rotated by the power driven pinion 19, Figure 5, meshing therewith and mounted upon the vertical shaft 20. The latter passes into the reduction gear box 21 from whence the shaft 22 extends. This shaft is driven by the chain and sprocket driving means 23 interconnected to the shaft 24, which receives power from the variable speed gear box 25 coupled thereto, as shown in Figure 2. The change speed gear box 25 is adjusted with respect to its speed ratios by the controlled handwheel 26 and is supplied with power from the motor 27 drivingly connected to it.

The driving unit 27 and 25 as a whole is mounted upon the base means 28, the latter being supported by the cross members 29 of the frame 7. The change speed gear box 21 is similarly mounted on the frame 7, as shown in Figure 2. Shaft 24 extends longitudinally along the frame of the machine and is journaled near the opposite end in the bearing member 30, secured to the frame structure 7 by suitable cross members 31, which are in turn supported by the members 32. Intermediate the ends of the shaft, additional bearing journals such as indicated at 33 and 34 are provided which are similarly secured to the frame 7.

In this way the sprocket wheel 14 keyed to the shaft 10 and the conveyor chain 15 receives power from the motor 27, and may be driven at varying speeds according to the adjustment of the variable speed transmission 25, as controlled by the handwheel 26. The sprocket wheel 13 at the opposite end of the machine, however, functions as an idler and its shaft 9 is movable longitudinally of the machine, as shown in Figure 4. Movement is provided by adjusting the screws 35 so as to move the abutment 36 in which the shaft 9 is journaled so as to tighten or slacken the sprocket chain 15. Abutment 36 is slidably mounted on the crosshead members 37 attached to the frame 7. In a similar way the screw 38 provides adjustment for the opposite end of the shaft 9 for properly aligning the shaft.

Suitably spaced upon the sprocket conveyor chain 15 are the work carrier arm members generally designated 39, which may be of the double-file carrier type, as illustrated in Figure 1. It will be understood that other type of work piece carriers than that shown may be used. The work carriers 39 comprise a distorted Z-shaped shoe member 40 which is adapted to be slidably supported on the outer guide member 17 and be carried along by the conveyor chain 15.

The shoes are removably retained on the chain 15 by means of the engagement of the stub sockets 41 over a pair of the upstanding pin members 42 attached to the conveyor chain 15. Suitably secured to a flange section of the shoe 40, overhanging the guide 17, are the double-file rack carrier arm members 43 which are connected at the lower end to the central section of a rack holder 44. The latter member extends transversely of the angle arms 43 and the outer ends are shaped in the form of hooks 44a upon which racks 45 may be hung. The racks 45 form a support for articles to be plated.

Normally the shoe member 40 and attached rack holder 44 will be moved in the orbital path of the conveyor chain, when the shoe members 41 are in engagement with two of the pins 42 fastened to the endless conveyor chain 15. The shoe and rack holder are supported while being moved along by the guide channel member 17. It will be understood where multiple tanks are used and where the rack carriers are to be raised out of the ends of the tanks, such as may be provided at the loading and unloading end, the rack carriers will be provided with suitable means, not shown, for raising and transferring the work piece material from one end of a tank to the next, or in and out of the ends of a tank. Such a mechanism is not a part of this invention.

The spider members 46 and 47 are mounted on the lower ends of the shafts 9 and 10 respectively, positioned at opposite ends of the machine. These spider wheel members are suitably secured to the frame members 6, and the shafts 9 and 10 are free to rotate therein. Vertical shifting of the shafts is prevented by the cap members 48 and collars 48a retained on the lower ends of the shafts by the lock nut 48b, as shown in Figures 4 and 5.

Electrical contact is made to the rack carrier through the contact bar 49 and the supporting member 17. Electric current is delivered to the racks 46 through bars 50 attached to the face of each of the angle members 43. This two-way current supply makes it possible to handle large racks at high current density. Optionally current may be supplied through member 49 only.

*Rapid end transfer mechanism*

The mechanism for effecting the fast end transfer mechanism of this invention is illustrated in Figures 4 and 5 and comprises a stationary cam member 51 having the cam surface 51a over which the roller 52 rolls. Roller 52 is rotatably mounted on the swingable arm member 53 which is pivotally mounted on a bracket 54 which in turn is secured to the sprocket 55. The sprocket 55 is rotated, swinging the attached arm member 53. The sprocket 55 may carry one or more arm members 53 as desired. If only one arm member is employed, the sprocket must make a revolution to every rack carrier advanced around the ends of the tank. If two arms are used, then it must make a revolution to every second rack carrier advanced around the end of the machine. If three arms are employed, then one revolution to every third rack carrier is required, etc.

Although the driving means for the rapid end transfer mechanism is supplied by the motor 27, this is optional, and separate power supply means may be employed. All that is necessary is that the proper timing of the conveyor chain and transfer member be effected so that the mechanism will pick up the work carriers at the proper time.

Sprocket member 55 preferably is driven through a gear reduction unit 56 receiving power from the main drive shaft 24, as shown in Figures 2 and 4. The driving connection, as shown in Figure 4, consists of a sprocket 57 on the main shaft 24, and the sprocket 58 on the shaft 59, which is driven by the interconnecting chain 60. Shaft 61 rotated through the gear reduction means 56 has mounted thereon the sprocket 62 which is drivingly connected to the sprocket 55 by the chain 63. Adjustable sprocket members 64 are provided for movement inward or outward to slacken or tighten the driving chain 63.

Figure 3:
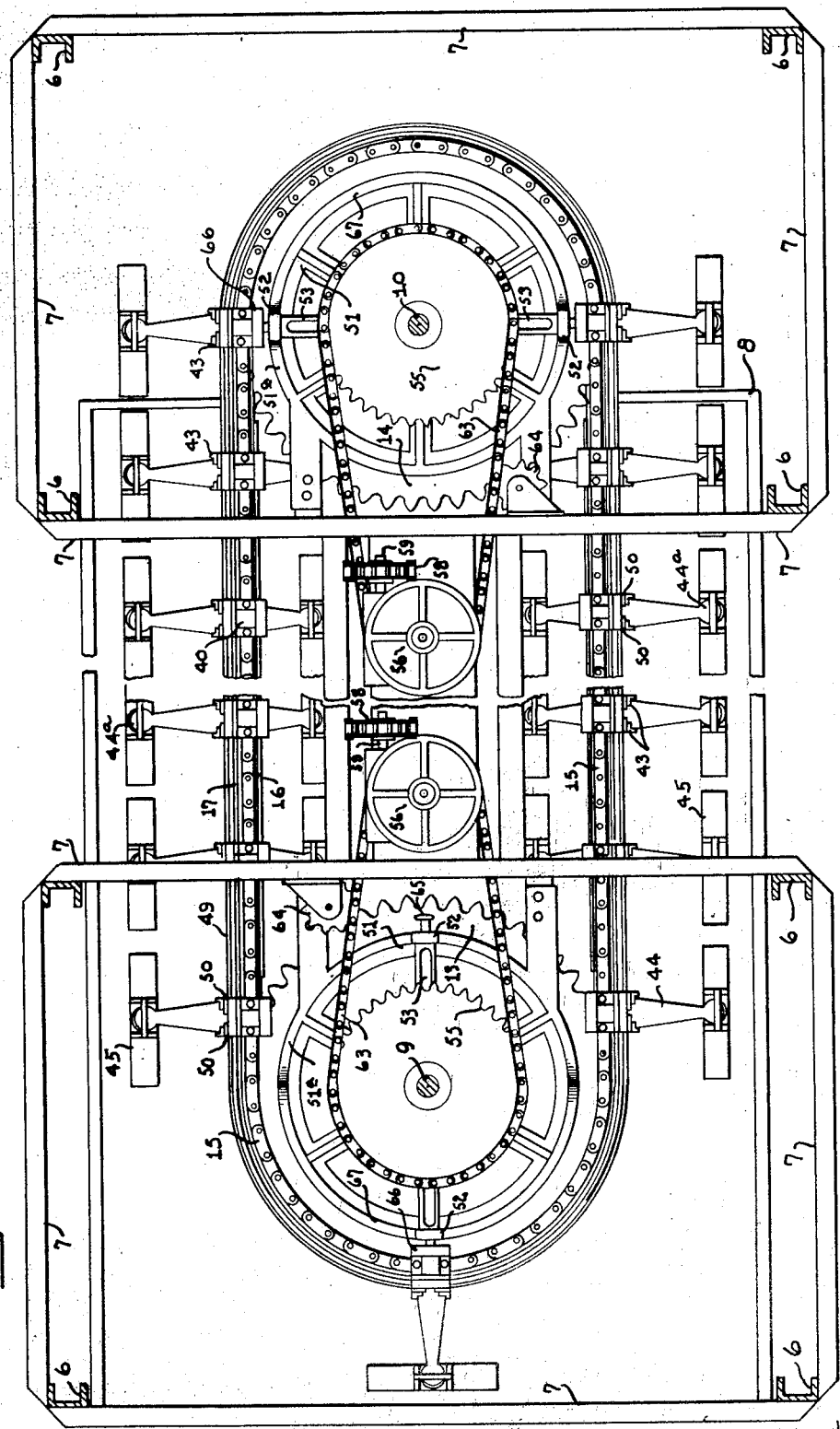
Figure 3 is a plan view similar to that of Figure 2 but with the driving mechanism and adjusting means removed to show the underlying mechanism.

Similar reduction gear and sprocket mechanism is employed for driving the fast transfer mechanism on the shaft 10 when employed at the opposite end of the machine, as illustrated in Figures 2, 3 and 4.

As shown in Figures 4 and 5, the outer end of the arm or arms 53 comprises a knob or head member 65, which when raised engages into the overhanging complementary portion 66 formed on the shoe 40 carrying the work piece rack holder.

*Operation of the rapid transfer end mechanism*

In operation the speed of the sprocket 55 and the arm or arms 53 is maintained somewhat faster than the speed of the main conveyor chain 15. The cam member 51 is positioned so that the raised cam surface 67 will be engaged by the roller 52 on the arm 53 and be lifted to contact the member 66 and pick up the moving shoe member 40. As the arm member 53 travels faster than the main chain it will raise the shoe off the pins 42 of the main chain 15, and while holding it above the main conveyor chain transfer it around the end and set it down on the appropriate pins on the opposite side of the machine. To insure registration of the recesses 41 of shoe members 40 with appropriate pins 42, on return of the same to the main conveyor chain it will be appreciated that the relative revolution speed of the sprockets 55 and 14 is such that this is readily effected. In this way the distance between the rack carriers and attached racks is increased, spreading out the work carriers and rapidly transferring them around the ends of the tank permitting ready access to the carrier racks as they are spread apart.

Not only is the work spread out as it passes around the end of the machine, permitting easier loading and unloading of the rack carriers, but also less plating is effected while the work is being moved around the ends of a plating tank. This is desired since the plating performed around the ends of the tank is less uniform. Electrical contact to the work rack holder while being transferred around the ends is provided for by means of the cathode charged member 49 which is slidably maintained in contact with the electrical conducting strip 50 fastened to the angle members 43.

It will be appreciated by those skilled in the art that the rapid end transfer mechanism of this invention is adapted for use in a variety of work piece conveyor type machines. Further the transfer mechanism may be installed at either or both ends of the machine where it is desired to derive the advantages resultant from the incorporation of the fast end transfer mechanism herein disclosed.

It will be also understood that the transfer mechanism herein disclosed is susceptible of various forms and modifications without departing from the scope of this invention, and such modifications as are necessary to adapt it to varying uses and conditions are contemplated within this invention.

Having fully described my invention, what I claim is new and desire to secure by Letters Patent, is:

1. In an electroprocessing machine of the return work piece carrying type, a frame, processing container means disposed therebeneath, a horizontally and vertically movable work carrier arranged on said frame, conveying means adapted to move said work carrier horizontally along the sides and around the ends of said frame, means disposed adjacent the end of said frame for engaging and moving said work carrier vertically and circularly around the end of said frame, said last mentioned means comprising a cam and rotating member associated therewith, said rotating member comprising means thereon which is adapted to engage said work carrier to move it out of engagement with said horizontal conveying means.

2. In an electroprocessing machine of the return type, a frame, work processing container means arranged along adjacent said frame, work carriers supported on said frame above said container means and adapted to be moved along the sides and around the ends of said frame, an endless conveyor for moving said work carriers along through said container, means movable independently of said endless conveyor disposed at the ends of said machine for engaging said work carriers successively to lift said carrier means off said endless conveyor and moving the same around the end at a higher rate of speed than said endless conveyor moving means, said transfer means comprising a rotatable arm member adapted to be operatively connected and disconnected with each of said work carriers at intervals.

3. In combination in an electroplating machine of the return type, a frame, an electrolyte plating tank arranged beneath said frame, endless conveying means arranged on said frame, a plurality of work carriers mounted on said conveying means and arranged to be moved through said tank, and rapid end transfer means comprising rotatable arm means which are adapted to engage said work carriers as they approach the end of said tank for moving said work carriers around the end of said tank independently of and disengaged from said endless conveying means.

4. In combination in an electroplating machine, a frame, an electrolyte plating tank arranged beneath said frame, endless conveying means arranged on said frame, a plurality of work carriers mounted on said conveying means and arranged to be moved through said tank, and rapid end transfer means for moving said work carriers around the end of said tank independently of and disengaged from said endless conveying means, said transfer means comprising a rotatable member and coacting stationary cam actuating means said rotatable member having means adapted to engage said work carriers successively and move them away from said endless conveying means and forward around the ends of said tank for a predetermined distance returning them to said conveying means.

5. In combination in an electroplating machine of the return type, processing container means, a frame, an endless conveyor for moving work horizontally along through said processing container means, work piece carriers mounted on and movable with said endless conveyor, electric current carrying means slidably in contact with said work piece carriers, means rotatably associated with the ends of said processing container, and auxiliary arm means carried by said rotatable means for engaging said carrier means and lifting the same off said endelss conveyor and carrying them around the end of said tank, said last mentioned means spreading out said work carriers to eliminate interference of said carriers while the same are being moved around the ends of said container.

6. In combination in an electroplating machine, a frame, an electroplating container, shafts disposed at the opposite ends of said frame, rotary means mounted on said shafts, endless conveyor means operatively connected to each of said rotary means, work carriers mounted on said endless conveyor, power actuating means on said frame for driving said rotary members to move said endless conveyor, and auxiliary rotary means mounted on at least one of said shafts and comprising movable means for engaging said work carriers lifting them from said endless conveyor means and moving them around the ends of said machine independent of the endless conveyor and returning the carriers to said endless conveyor.

7. In an electroprocessing machine, a frame, vertical shafts mounted on opposite ends of said frame, rotary means mounted on each of said shafts, endless conveyor means connecting said rotary means, an electrical conductor secured to said frame adjacent said endless conveyor, work piece carriers slidably supported on said electrical conductor means and removably in engagement with said endless conveyor, means mounted on said frame for driving said rotary members to thereby move said endless conveyor and work piece carrying means, and work carrier transfer means rotatably mounted on one of said shafts for engaging and removing said work carriers from said endless conveyor to move the same around the end of said machine independent of said endless conveyor and while in contact with said electrical conductor returning the same to said endless conveyor at a different location.

8. In an electroprocessing machine, a frame, sprocket wheels rotatably mounted on vertical shafts disposed at each end of said frame, an endless conveyor chain interconnecting said sprockets, work piece carrier means removably mounted on said chain, adjustable speed power driving means connected with one of said shafts and driving the sprocket member associated therewith, independent sprocket driven rotary means mounted on at least one of said shafts, and variable speed means associated with said first power driving means for actuating said independent sprocket means, said independent rotary means comprising arms adapted to engage said carrier means as the same approach the end.

9. In a work piece conveying machine of the return type, a frame, a tank for holding treating solution positioned therebeneath, an endless conveyor chain arranged on said frame over said tank, means comprising sprocket wheels arranged at the opposite ends of said frame and engageable with said conveyor chain, means for driving at least one of said sprocket wheels, work carrier means spacedly positioned on said endless conveyor and carried thereby, said endless conveyor being disposed to travel along a straightaway and around the ends of said machine, and auxiliary work carrier transporting means associated with the portion of said endless conveyor traveling around the ends of said machine, said auxiliary comprising a rotatable member, work arm supporting means carried by said rotatable member, said last mentioned member being disposed above said endless traveling conveyor, said work arm supporting means positively engaging said work carrier means as it nears the ends of said machine disengaging it from said endless conveyor and moving the same around the curved end sections of said endless conveyor independently thereof and at a different rate of speed from said endless conveyor.

10. In a work piece processing machine, a frame, an endless conveyor arranged on said frame, work carrier means removably positioned on said endless conveyor, said conveyor being adapted to move said work carrier means in an orbital path, and independent work carrier transporting means comprising a rotatable work carrier supporting arm means for positively engaging said work carrier means to move the same free of said endless conveyor and transport it around the curved end sections of said endless conveyor independent of the endless conveyor.

11. In an electroplating machine of the return work piece carrying type, a frame, electroplating container means disposed therebeneath, endless conveying means supported on said frame comprising an endless member movable along the sides and around the ends of said frame, work piece carrier means removably mounted on said endless conveying means at spaced intervals, means for moving said endless conveyor, and means independent of said endless conveying means positioned adjacent the ends of said machine comprising a circular stationary cam and associated rotatable arm means adjustably cooperating therewith and adapted to engage said work carrier means and lift the same from said endless conveying means and transport it around the end of said frame and thereafter replacing said carrier onto said endless conveying means for return movement along the opposite side of said machine.

12. In an electroplating machine of the return work piece carrying type, a frame, electroplating container means disposed therebeneath, endless conveyor means comprising an endless movable chain positioned on said frame and adapted to move horizontally along the sides and around the ends of said frame, work carrier means spacedly positioned along said endless conveyor, and auxiliary mechanism arranged adjacent the ends of said frame adapted for moving said work carrier means out of engagement with said endless conveyor and transporting the same circularly around the end portion of said frame, said mechanism including a stationary cam and rotatable arm means adjustably cooperating therewith and arranged above said endless conveyor, said rotatable arm means on said auxiliary mechanism being adapted to engage said work carrier means and remove it from said endless conveyor and transport it along independently of said conveyor to another position forward on said endless conveyor means, said independent transporting means being adjustably actuated in timed relationship with said endless conveyor.

13. In an electroprocessing machine, a frame, work processing container means arranged along adjacent said frame, an endless conveyor chain means carried by said frame, work carrier means supported on said frame and moved by said endless conveyor means, said endless conveyor being arranged to move said work carriers along the sides and around the ends of said frame whereby work pieces supported on said work carriers are moved along through said processing container means, and means movable independently of said endless conveyor and disposed at the ends of said machine comprising arm means movable over a stationary inclined cam way, said arm means being adapted to engage said work carrier means as the same approach the end of said machine to disengage said carrier means from said endless conveyor chain and move said work carrier means therealong around the end of the machine at a higher rate of speed than said endless conveyor moving means and thereafter replacing said work carrier means onto said chain.

14. In combination, a work piece conveying machine comprising a frame, processing tanks arranged in succession along the sides and around the ends of said frame, an endless chain conveyor supported on said frame, said endless conveyor being adapted to move in a straightaway path along the sides and in a curved path around the ends of said frame, means for moving said endless conveyor, work carrier means removably positioned on said endless conveyor, independent work carrier transporting means arranged adjacent the ends of said frame and elevated over said endless conveyor, said independent work carrier means comprising an elevated trackway arranged substantially parallel to said curved portion of the endless conveyor and means rotatable thereover and adapted to engage said work carrier means as they approach the ends of said frame to engage and lift the carrier means off said endless conveyor and move them independently of said conveyor around the ends of said frame returning said work carrier means onto said endless conveyor on the straightaway path on the opposite side of the machine.

15. In a work piece processing machine, a frame having ends, a work carrier, conveyor means for moving said work carrier horizontally in a path along the sides and around the ends of said frame, auxiliary means independent of the conveyor means and comprising a rotating arm member for engaging said work carrier and moving it vertically off said conveyor and horizontally around at least one of the ends of said frame, and a cam member operatively associated with said rotatable arm member, said auxiliary means being arranged to operate in timed relationship with said first mentioned work carrier moving means.

16. In combination, in a work piece conveying machine of the return type, an endless conveyor movable along the sides and around the ends of said machine, work piece carrier means on said endless conveyor, and auxiliary work piece conveyor means coacting in timed relationship with said movable endless conveyor for engaging said work piece carrier means as it approaches the end of said machine and lifting it off said endless conveyor and moving said carrier means around the end of said machine independently of said endless conveyor, said auxiliary conveyor comprising a cam controlled movable arm member which is arranged to move parallel to the end path of said endless conveyor and above it.

VICTOR FINSTON.